United States Patent
Tominaga et al.

(10) Patent No.: US 6,904,891 B2
(45) Date of Patent: Jun. 14, 2005

(54) INTAKE SYSTEM OF INTERNAL COMBUSTION ENGINE

(75) Inventors: Kensuke Tominaga, Yokohama (JP); Taro Sakai, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/815,969

(22) Filed: Apr. 2, 2004

(65) Prior Publication Data

US 2004/0231638 A1 Nov. 25, 2004

(30) Foreign Application Priority Data

Apr. 18, 2003 (JP) ........................................ 2003-113600

(51) Int. Cl.[7] .................................................. F02B 3/00
(52) U.S. Cl. ...................................... 123/302; 123/432
(58) Field of Search ............................... 123/302, 306, 123/308, 432, 193.5, 403, 118.4

(56) References Cited

U.S. PATENT DOCUMENTS

| | | | | |
|---|---|---|---|---|
| 4,519,350 A | * | 5/1985 | Oda et al. ................... | 123/308 |
| 4,543,931 A | * | 10/1985 | Hitomi et al. .............. | 123/308 |
| 6,363,903 B1 | * | 4/2002 | Hayashi et al. ........... | 123/193.5 |
| 6,588,399 B2 | * | 7/2003 | Okamoto et al. ........... | 123/305 |

FOREIGN PATENT DOCUMENTS

| | | |
|---|---|---|
| JP | 6-159079 A | 6/1994 |
| JP | 6-159203 A | 6/1994 |
| JP | 2001-193469 A | 7/2001 |
| JP | 2001-248484 A | 9/2001 |
| JP | 2002-54535 A | 2/2002 |

OTHER PUBLICATIONS

U.S. Appl. No. 10/676,077, filed Oct. 2, 2003, Sakai et al.
U.S. Appl. No. 10/616,076, filed Oct. 2, 2003, Arimatsu et al.
U.S. Appl. No. 10/816,001, filed Apr. 2, 2004, Sakai et al.
U.S. Appl. No. 10/815,972, filed Apr. 2, 2004, Nishii et al.
U.S. Appl. No. 10/815,974, filed Apr. 2, 2004, Sakai.

* cited by examiner

*Primary Examiner*—Mahmoud Gimie
(74) *Attorney, Agent, or Firm*—Foley & Lardner LLP

(57) ABSTRACT

An internal combustion engine includes an intake port leading to an engine cylinder. The intake port is divided into first and second passage section by a partition extending in the intake port in a longitudinal direction of the intake port. A gas motion control valve is arranged to open and close an upstream end of the second passage section. A connection passage connects an upstream end portion of the second passage section to the first passage section. A bulge is formed in a first part of a circumferential region surrounding the downstream port end so as to prevent air from being drawn from the cylinder into the second passage section.

16 Claims, 11 Drawing Sheets

INTAKE SYSTEM OF INTERNAL COMBUSTION ENGINE

BACKGROUND OF THE INVENTION

The present invention relates to an intake system for an internal combustion engine, and more specifically to an intake system including an intake port for increasing incylinder gas motion such as tumble or swirl.

Gas motion in engine cylinder such as tumble or swirl is one of important factors to achieve stable combustion of diluted air/fuel mixture in a spark ignition internal combustion engine. Accordingly, engines of some types require an intake system which can increase incylinder gas motion in wider engine operating region.

A published Japanese Patent Application Kokai Publication No. 2002-54535 shows a gas motion control valve to increase incylinder gas flow by closing a part of the section of an intake port with a gas motion control valve. For tumble, for example, the gas motion control valve is disposed in a lower part of the intake port, and arranged to strengthen the intake air stream alongside the upper side of the intake port. A published Japanese Patent Application Kokai Publication No. H06(1994)-159079 shows an intake system including a partition dividing an intake port into upper and lower halves, and a gas motion control valve closing the lower half of the intake port, to increase a tumble ratio.

SUMMARY OF THE INVENTION

Such a gas motion control valve is arranged to produce an incylinder tumbling flow by decreasing an open area ratio that is a ratio of an effective flow passage sectional area to an entire flow passage area of an intake port. However, as the open area ratio becomes smaller, the flow resistance increases, and the amount of intake air that a cylinder can take in becomes smaller. Therefore, an engine operating region in which an incylinder flow is increased by a gas motion control valve is limited to a relatively narrow range.

It is an object of the present invention to provide an intake system for increasing incylinder gas motion without decreasing the open area ratio of an intake port excessively.

According to one aspect of the present invention, an internal combustion engine, comprises: a main section defining an intake port leading to a cylinder of the engine; an intake valve arranged to open and closet a downstream port end of the intake port; and a flow regulating section to regulate an intake air flow in the intake port into the cylinder. The flow regulating section includes; a partition extending in the intake port in a longitudinal direction of the intake port from an upstream end to a downstream end, and dividing the intake port into first and second passage sections; a gas motion control valve located by the upstream end of the partition, to open and close the second passage section; a connection passage formed near the gas control valve, to connect the first and second passage sections, and to allow recirculation flow of intake air in the second passage section from the second passage section to the first passage section when the second passage section is closed by the gas motion control valve; and a bulge formed in a first part of a circumferential region surrounding the downstream port end of the intake port on a side near the second passage section.

According to another aspect of the invention, an intake apparatus for an internal combustion engine, comprises: first means for defining an intake port; second means for dividing the intake port into first and second passage sections extending in a longitudinal direction of the intake port; third means for closing an upstream end of the second passage section and forming a low pressure region in the first passage section; fourth means for drawing intake air from a downstream end of the second passage section through the second passage section to the low pressure region in the first passage section when the upstream end of the second passage section is closed; and fifth means for restraining a reverse flow of fluid drawn from the combustion chamber into the second passage section of the intake port.

DETAILED DESCRIPTION OF THE INVENTION

Figure 1:
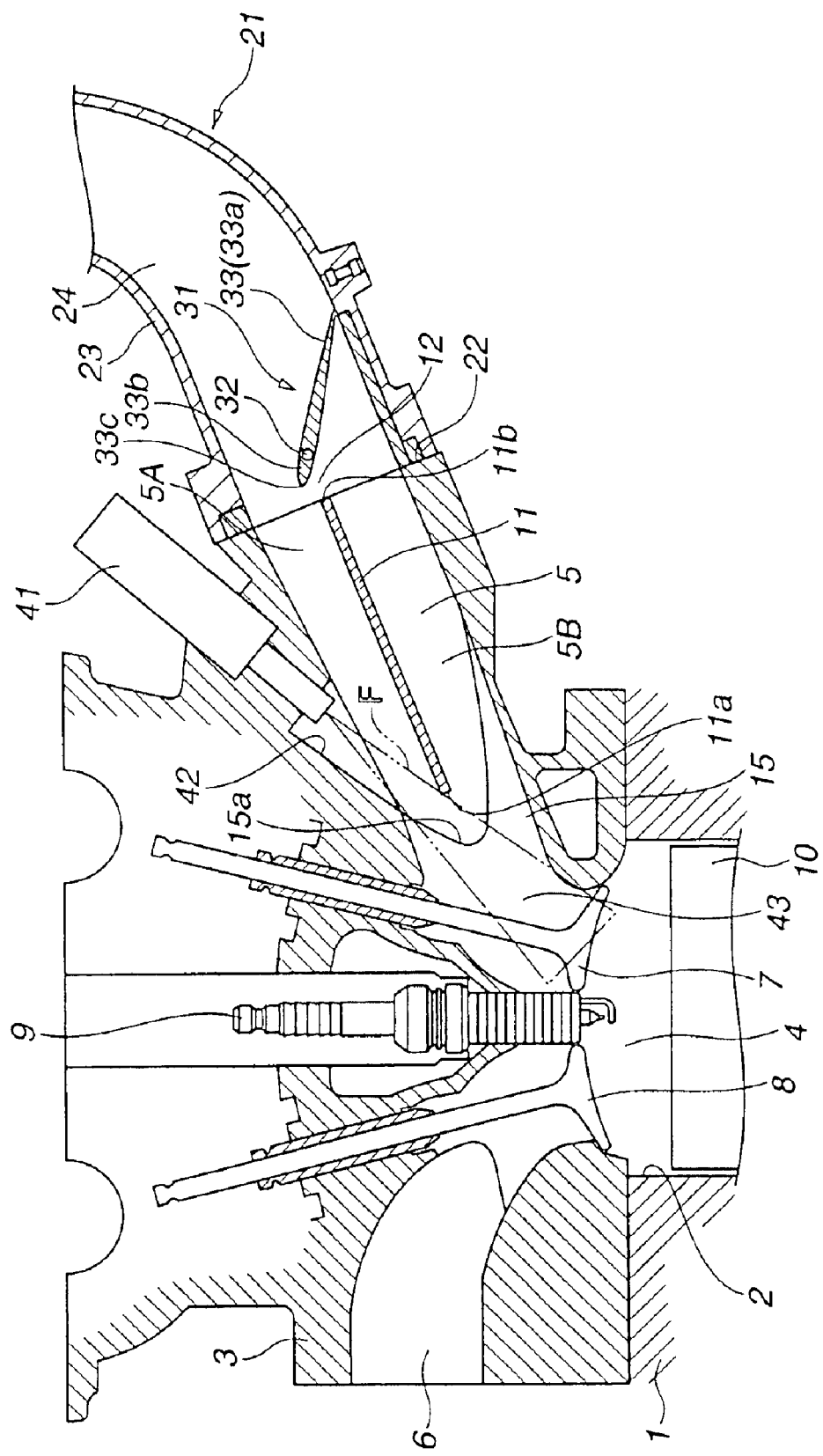
FIG. 1 is a sectional view showing an engine with an intake system according to a first embodiment of the present invention.
Figure 2:
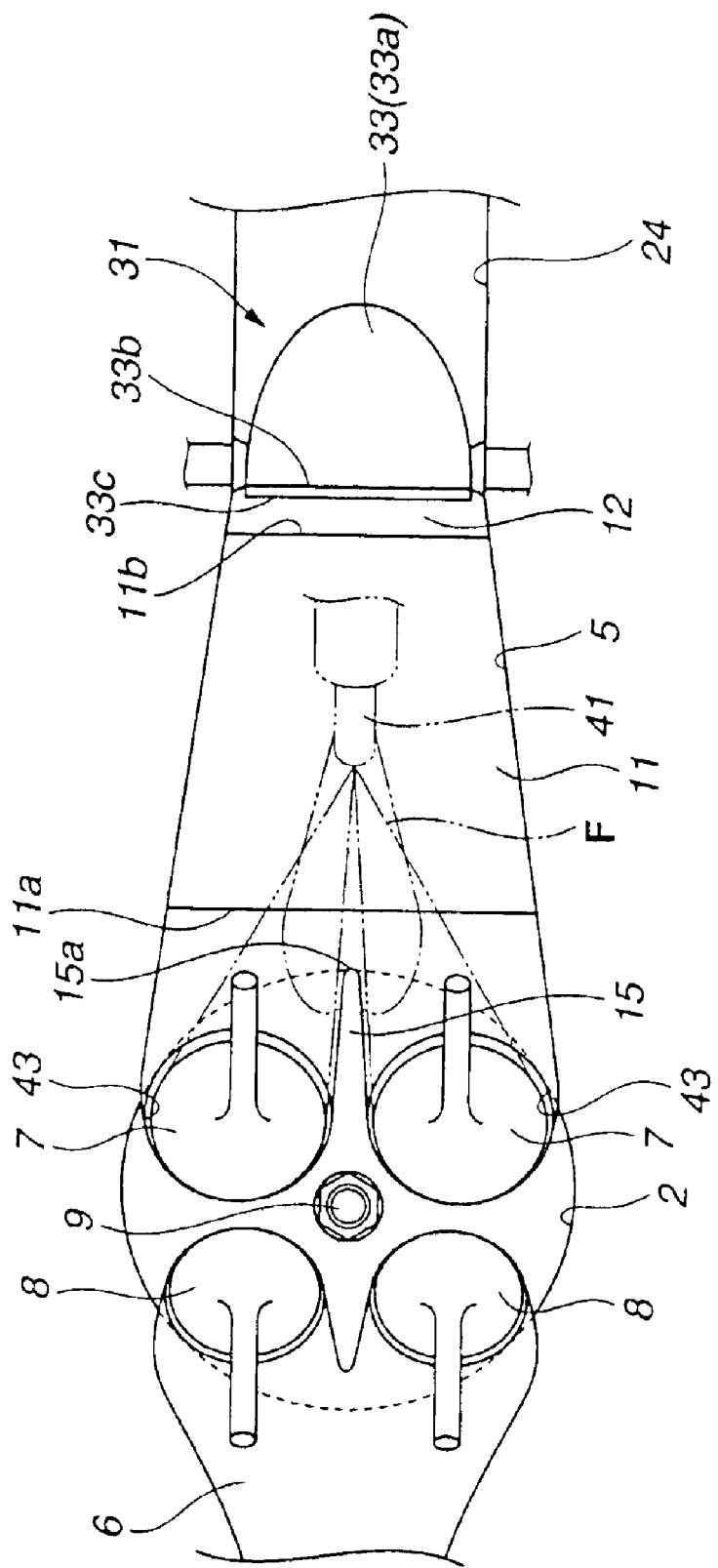
FIG. 2 is a plan view of the intake system of FIG. 1 as viewed from above.

FIGS. 1 and 2 show a part of an internal combustion engine having an intake system according to a first embodiment of the present invention. The engine of this example is a port injection spark ignition engine. The intake apparatus or system is designed to strengthen an incylinder gas motion which, in this example, is tumble. However, this apparatus may be applied to other types of engine, such as a direct injection spark ignition internal combustion engine.

A cylinder block 1 is formed with a plurality of cylinders 2 having a cylindrical shape. A cylinder head 3 closes the upper ends of the cylinders 2. Cylinder head 3 is formed with a plurality of recesses each defining a combustion chamber 4. In this example, combustion chamber 4 of each cylinder is of the pentroof type, and having two sloping surfaces. As shown in FIG. 1, an intake port 5 extends to a downstream port end (43) opening in one of the two sloping surfaces of combustion chamber 4. An exhaust port 6 opens in the other sloping surface of combustion chamber 4. An intake valve 7 shown in FIG. 1 is arranged to open and close the downstream end of intake port 5. An exhaust valve 8 is arranged to open and close the end of exhaust port 6. In this example, a downstream end portion of intake port 5 is bifurcated by a center wall 15 extending vertically in an up-and-down or axial direction of the cylinder, and has two branches each opening into combustion chamber 4. Accordingly, each cylinder has two intake valves 7 for opening and closing the downstream port ends (43) of two branches of intake port 5. Similarly, each cylinder has two exhaust valves 8. A spark plug 9 is provided at the center of combustion chamber surrounded by these four valves 7 and 8. A piston 10 is received in each cylinder 2. In FIG. 1, piston 10 is shown to have a flat top. However, the piston crown may be designed to have various shapes according to various requirements, such as requirement for stratified charge combustion. In the up-down (axial) direction of each cylinder, piston 10 moves upward toward spark plug 9, and moves downward away from spark plug 9.

The intake system shown in FIGS. 1 and 2 includes a partition 11 extending in the longitudinal direction of intake port 5 and dividing the cross section of intake port 5 into an upper region and a lower region. In this example, partition 11 is a metal plate formed as an insert in an operation of casting cylinder head 3, and completed as an integral part of the casting. In this example, cylinder head 3 is a casting of aluminum alloy, and partition 11 is a steel plate. A downstream end 11a of partition 11 is located near intake valves 7. Downstream end 11a of partition 11 confronts an upstream end 15a of the before-mentioned center wall 15 in the vicinity. In the example shown in FIG. 1 (the sectional view taken by a plane perpendicular to the crankshaft of the engine), the portion of intake port 5 receiving partition 11 extends straight in the longitudinal direction of intake port 5, and accordingly partition 11 is in the form of a flat plate extending straight in the longitudinal direction of intake port 5. However, intake port 5 may be curved, and partition 11 may be curved along the curved section of intake port 5.

An upstream end 11b of partition 11 of this example extends up to a bearing surface 22 of cylinder head 3 to which an end of an intake manifold 21 is attached. In this example, partition 11 is entirely located in cylinder head 3. Partition 11 may be arranged so that upstream end 11b is located at a position recessed inwardly from the bearing surface 22 toward the downstream side, to avoid interference between partition 11 of steel and a tool for machining bearing surface 22. In this example, upstream end 11a and downstream end 11b both extend rectilinearly in parallel to the flat bearing surface 22 of cylinder head 3. Therefore, the metal plate of partition 11 is in the form of a trapezoid. However, this shape depends on the geometry of intake port 5.

"Upper" means "higher" in position in an axial direction of cylinder 2 from the position of the crankshaft toward the combustion chamber 4. Intake port 5 is an air passage which may be formed only in cylinder head 3. Alternatively, intake port 5 may be formed in cylinder head 3 and an external member, such as an intake manifold, fixed to cylinder head 3.

Partition 11 divides intake port 5 into an upper fluid passage section 5A formed between partition 11 and an upper inside wall surface of intake port 5, and a lower fluid passage section 5B formed between partition 11 and a lower inside wall surface of intake port 5.

Intake manifold 21 includes a collector section and branch sections 23 each extending from the collector section to the intake port of a unique one of the engine cylinders. Therefore, intake port 5 is continuous with a branch passage 24 of the corresponding branch section 23. Thus, an intake passage is formed from the collector section to each cylinder 2. Each branch section 23 includes a downstream section extending rectilinearly in conformity with the straight intake port 5, and an upstream section curved upward to the collector section located above the branch sections.

A gas motion control valve (or intake control valve) 31 is provided for each cylinder, and arranged to open and close an upstream end of lower fluid passage section 5B. Gas motion control valve 31 is disposed in a downstream end portion of the corresponding branch section 23 of intake manifold 21. In this example, a valve shaft 32 of gas motion control valve 31 is located on an (upstream) extension of partition 11 on the upstream side of partition 11. In the example of FIG. 1, valve shaft 32 is located at a position adjacent to upstream end 11b of partition 3, on the upstream side of the upstream end 11b of partition 3. Valve shaft 32 is supported in the branch section 23 of intake manifold 21. A plate-shaped valve element 33 is fixedly mounted on valve shaft 32. Valve element 33 includes a first portion (or main portion) 33a extending from valve shaft 32 in one direction, and a second portion (short extension) 33b extending from valve shaft 32 in the opposite direction. Second portion 33b is shorter than first portion 33a. First portion 33a is shaped like a half of an ellipse corresponding to the shape of a lower half of branch passage 24, as shown in FIG. 2. Second portion 33b has a downstream end 33c extending rectilinearly in parallel to the bearing surface 22 of cylinder head 3, and to the straight upstream end 11b of partition 11. Valve shaft 32 is close to upstream end 11b of partition 11, but spaced from upstream end 11 through such a distance as to avoid interference between second portion 33b of valve element 33, and upstream end 11b of partition 11. In this example, downstream end 33c of portion 33b is located at a position slightly recessed from a flange surface of the branch section 23 to the upstream side. The flange surface of the branch section 23 is put in contact with the bearing surface 22 of cylinder head 3).

Valve shaft 32 is connected with an actuator (not shown). Gas motion control valve 31 is controlled to a closed position shown in FIG. 1 in an engine operating situation to strengthen tumble. In the closed position to close the upstream end of second passage section 5B as shown in FIG. 1, first valve portion 33a is located on the upstream side of valve shaft 32, and valve element 33 is so inclined as to guide the intake flow toward upper inside wall surface into the first passage section 5A on the upper side. First valve portion 33a is so shaped as to fully close the region under valve shaft 32 in such an inclined position. In this example, an inclination angle of valve element 33 (that is, an angle formed between an upstream extension of partition 11 and valve element 33) in the closed state is in the range of 30°~40°. In the closed state, second valve portion 33b projects upward in upper passage section 5A above the level of partition 11. Between upstream end 11b of partition and downstream end 33c of second valve portion 33b, there is formed an interspace 12 serving as a connection passage to allow recirculating flow of intake air in lower passage section 5B from lower passage section 5B to upper passage section 5A when lower passage section 5A is closed by gas motion control valve 31. In this example as shown in FIG. 2, this interspace 12 extends laterally with a uniform width like a straight slit, between the straight upstream end 11b of partition 11 and the straight downstream end 33c of valve element 33.

In an engine operating region such as a high speed high load region where the intake air quantity becomes greater, gas motion control valve 31 is brought to an open position at which valve element 33 extends in the longitudinal direction of intake port 5 (along the flow direction of the intake air). Both of first and second valve portions 33a and 33b of gas motion control valve 31, when in the open position, extend continuously from upstream end 11b of partition 11, in line with partition 11 along the flow direction, so that the passage resistance becomes minimum. Downstream end 33c of second valve portion 33b confronts close to upstream end 11b of partition.

A fuel injector (injection valve) 41 is for injecting fuel into intake port 5 of each cylinder. Fuel injector 41 is disposed above intake port 5 of cylinder head 3. In this example, fuel injector 41 is of a type producing a fuel spray F bifurcated in the shape of letter V so as to direct fuel toward a pair of intake valves 7. Fuel injector 41 is located at the middle in the lateral or widthwise direction (that is, the front and rear direction of the engine) as shown in the plan view of FIG. 2. As shown in FIG. 2, the intake system including one intake port 5, two intake valves 7, one fuel injector 41 and one gas motion control valve 31 is substantially symmetrical in the manner of bilateral symmetry. As shown in FIG. 1, fuel injector 41 is inclined and positioned at a relatively downstream position near the intake valves 7 so that the fuel spray F is directed to the valve openings of intake valves 7 without interference with partition 11. A fuel spout hole at the forward end of fuel injector 41 is located above partition 11 near the downstream end of upper passage section 5A, and directed in an oblique direction to produce the fuel spray spreading toward intake valves 7 without interfering with partition 11. A recessed portion 42 is formed in the upper wall surface of intake port 5, so that the fuel spray F passes through the space in this recessed portion 42 without interfering with the internal walls of cylinder head 3.

Figure 7:
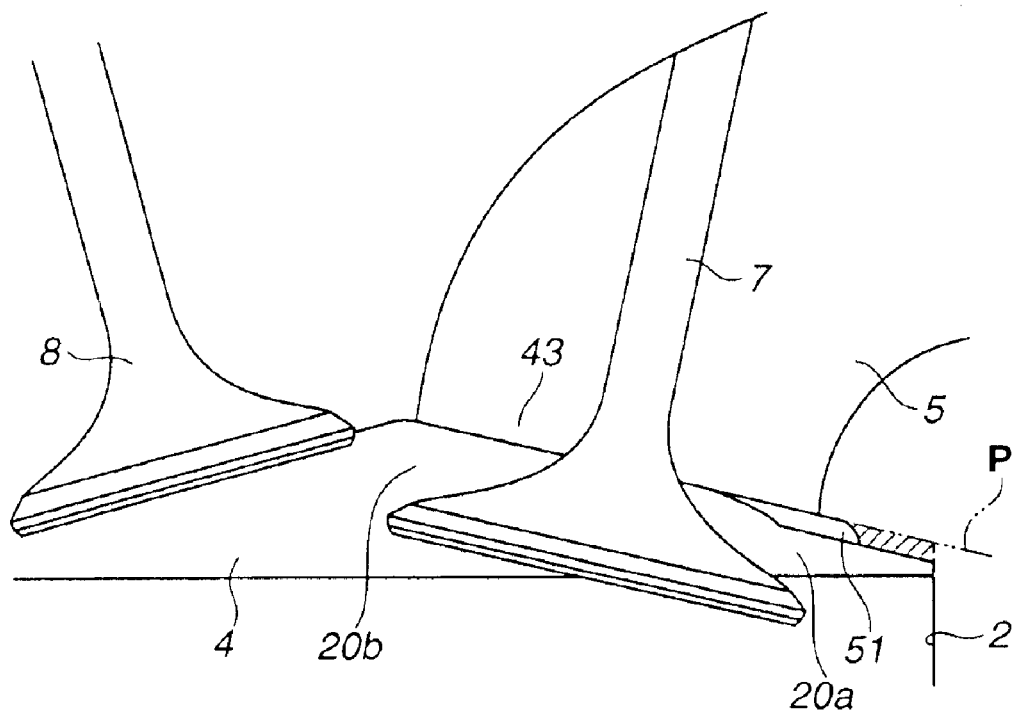
FIG. 7 is an enlarged sectional view showing a bulge formed in a masking area in a first practical example which can be employed in the present invention.
Figure 8:
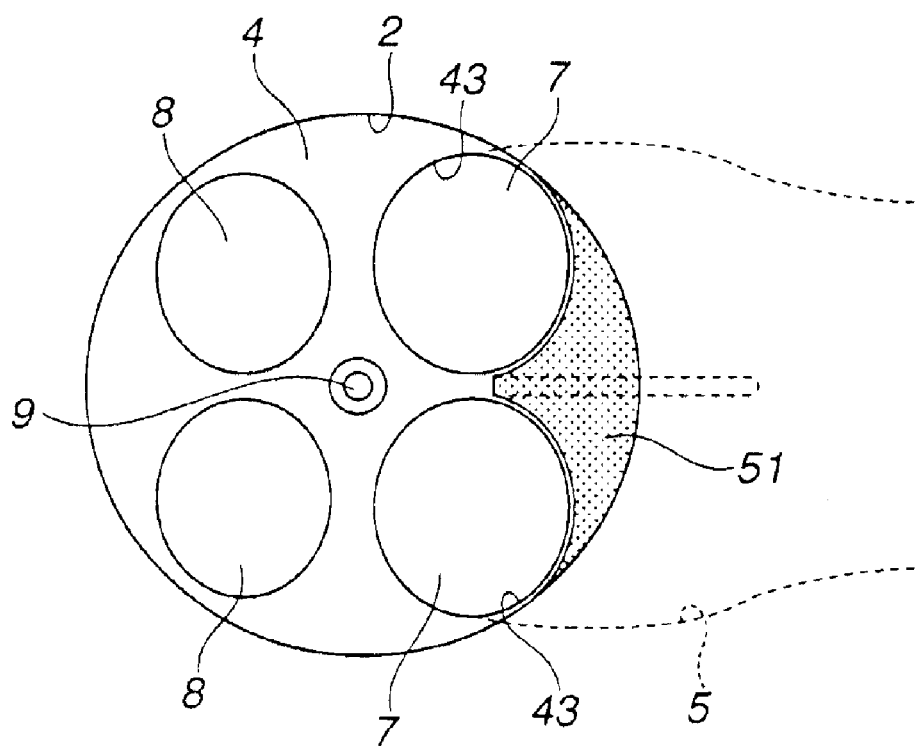
FIG. 8 is a view showing the masking area of FIG. 7 in a combustion chamber as viewed from below.

Near the downstream port ends (or intake valve openings) 43 which are opened and closed by intake valves 7, respectively, there is further provided a masking area having a bulge 51 (as shown in FIGS. 7 and 8) designed to prevent or restrain the intake air from being drawn backward (in the form of reverse flow) from the inside of cylinder 2 toward intake port 5. The masking area is located just downstream of the downstream port ends 43 or just upstream of the downstream port ends 43.

The internal combustion engine of this example is further equipped with an exhaust gas recirculation (EGR) system (not shown) of a known type including an EGR control valve. In particular, this engine is arranged to further decrease the fuel consumption in a part-load engine operating region by achieving stable combustion at a high EGR rate with the aid of incylinder tumble. An EGR gas may be introduced into the collector section of intake manifold 21 or may be introduced to each branch passage 24.

The thus-constructed intake system is operated as follows: On intake stroke, intake valves 7 are opened and piston 10 descends in the downward direction in cylinder 2. In this case, intake air flows into cylinder 2 through an open aperture around each intake valve 7. If, in this case, gas motion control valve 31 is in the open position, intake air flows through both of upper and lower passage sections 5A and 5B, and the intake air flows into cylinder 2 uniformly around intake valve 7. Therefore, the incylinder gas flow is relatively weak.

Figure 3:
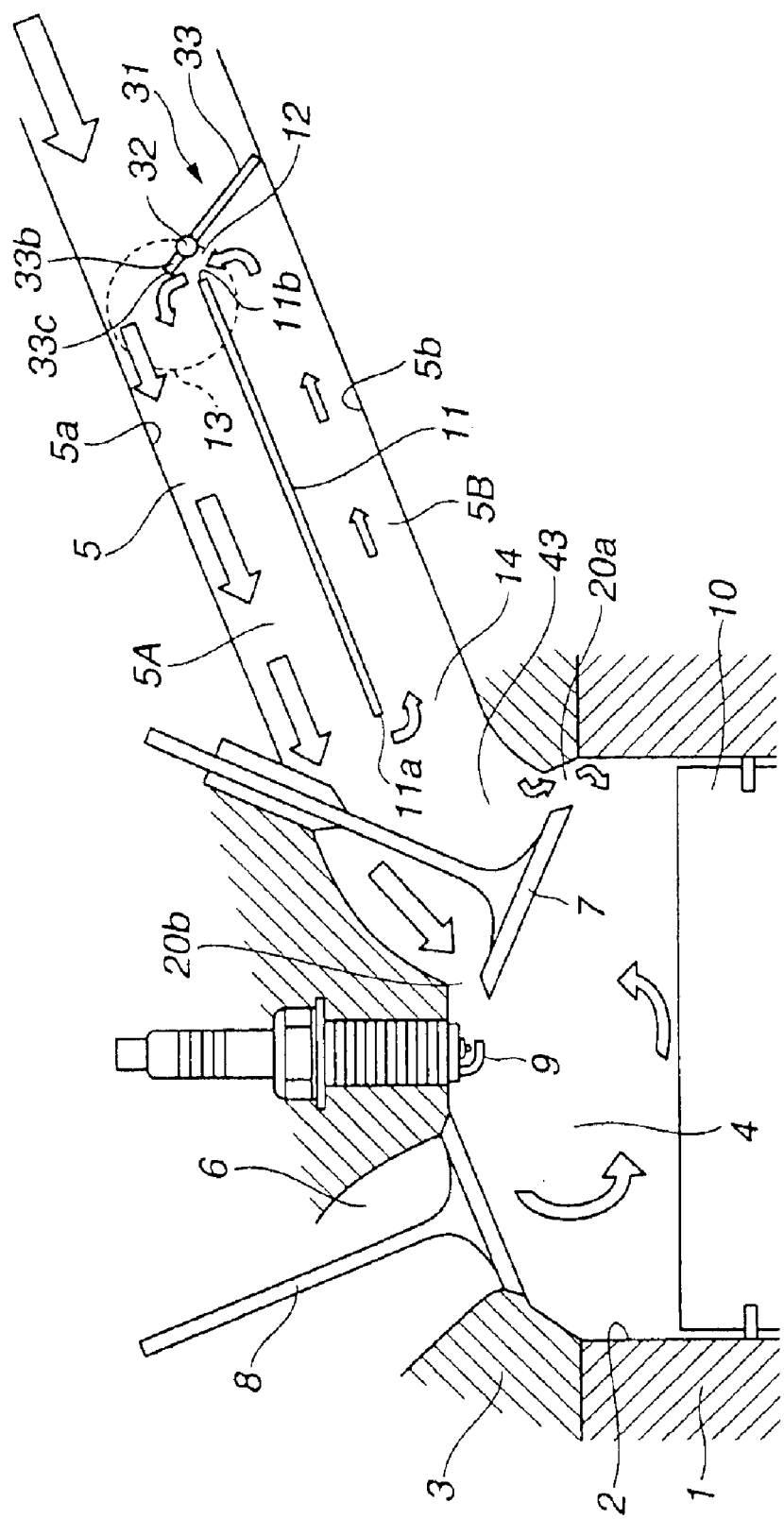
FIG. 3 is a sectional view schematically illustrating the intake system according to the first embodiment.

If, on the other hand, gas motion control valve 31 is in the closed position as schematically shown in FIG. 3, second passage section 5B is closed, and the intake air flows toward cylinder 2 only through upper passage section 5A.

Specifically, an intake air stream alongside an upper inside wall surface 5a of intake port 5 is increased whereas an intake air stream alongside a lower inside wall surface 5b of intake port 5 is decreased. Therefore, the intake flow rate is smaller and the flow velocity is lower in a lower portion 20a of the open aperture between intake valve 7 and the outer circumference of the cylinder 2. In an upper portion 20b of the aperture formed between intake valve 7 and spark plug 9, the intake flow rate is great and the flow velocity is high. In the cylinder 2, there is formed a strong tumbling fluid motion as shown by arrows in FIG. 1 (so-called forward tumble) flowing from the intake side of intake valves 7 to the exhaust side of exhaust valves 8, and toward the piston crown. Moreover, gas motion control valve 31 in the closed state as shown in FIG. 3 serves as a throttle portion throttling the fluid passage only to upper passage section 5A, and thereby produces a local low pressure region 13 in upper passage section 5A at a position near the upstream end 11b of partition 11. Connection passage 12 is opened in this low pressure region 13, and there is formed a pressure difference between a downstream open end 14 of lower passage section 5B and connection passage 12. Because of this pressure difference, part of the intake air is taken in from downstream open end 14, into lower passage section 5B, and caused to flow backward to the upstream side through lower passage section 5B, and discharged through connection passage 12 into the low pressure region 13 in upper passage section 5A. Therefore, most of intake air flows along upper inside wall surface 5a to intake valve 7. Consequently, the intake air stream through upper portion 20b of the aperture formed between intake valve 7 and spark plug 9 is further increased, and the intake air stream through the lower portion 20a of the open aperture between intake valve 7 and the outer circumference of the cylinder 2 is decreased. Thus, this intake apparatus can further increase the incylinder tumble. This intake apparatus can promote the tumble in the cylinder effectively, by strengthening the upper intake flow stream, and on the other hand by reducing the lower intake stream flowing along the lower inside wall surface 5b, into cylinder 2 in such direction as to impede the incylinder tumbling motion.

The thus-produced strong incylinder tumble is very helpful for increasing the EGR quantity to improve the fuel economy. In the part load region, the intake system can achieve stable combustion for better fuel consumption by increasing the amount of EGR and producing strong tumble by closing gas control valve 31.

In this example, second valve portion 33b of valve element 33 projects upward toward upper passage section 5A in the closed position shown in FIG. 3, and thereby produces the low pressure region effectively behind the second valve portion 33b to ensure the intake recirculating flow through connection passage 12.

In the open position, valve element 33 of gas control valve 31 extends continuously with partition 11 so as to minimize an increase of the flow resistance of intake air. Second valve portion 33b reduces the opening size of connecting passage 12 to reduce disturbance in the intake air flow. In this example, the plate-shaped valve element 33 is not a plate having a uniform thickness, but the first valve portion 33a of valve element 33 is taped so that the thickness becomes gradually smaller to the upstream end, and the second valve portion 33b is also taped so that the thickness becomes gradually smaller to the downstream end 33c, as shown in FIG. 1. This contouring of valve element 33 is effective for reducing the intake air flow resistance.

Figure 4:
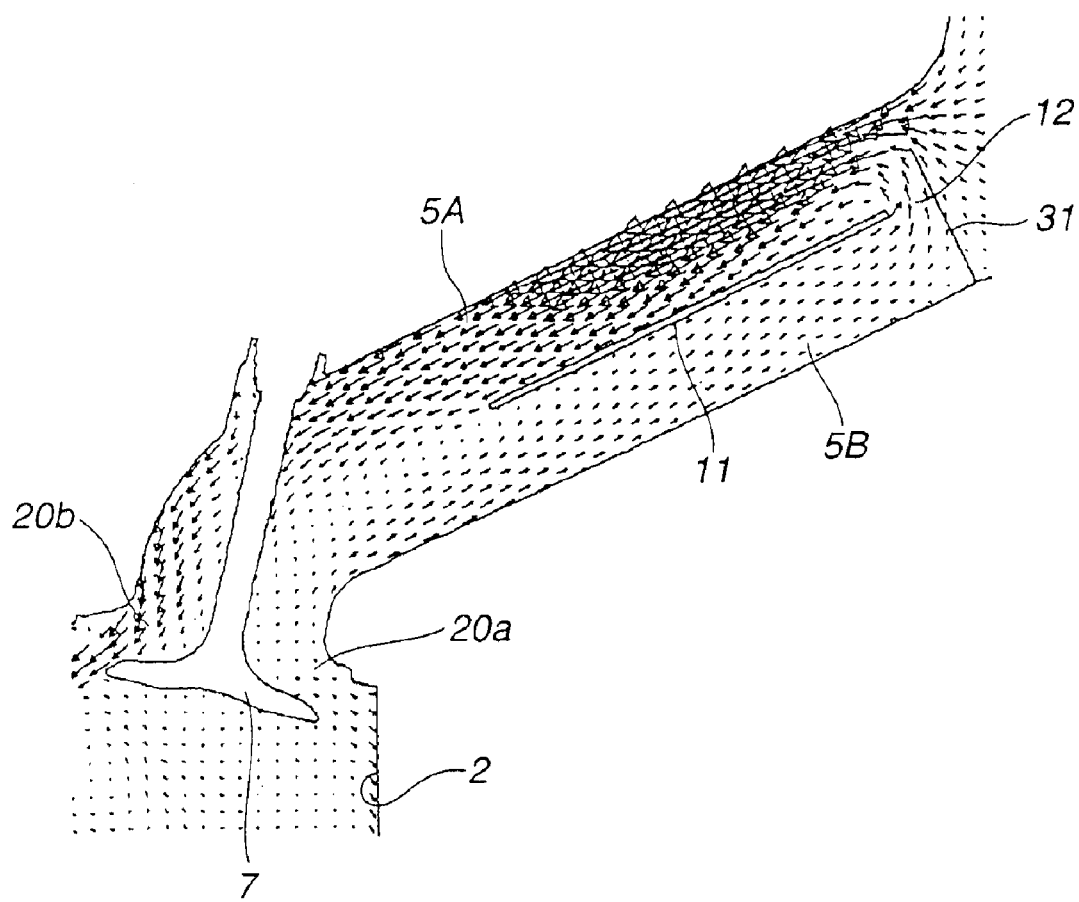
FIGS. 4 and 5 are schematic sectional views illustrating intake air streams in an intake port in the example of FIG. 1, and in an intake port in a comparative example.

FIG. 4 shows the results of analysis of actual intake air flow in the intake system according to the first embodiment.

Figure 5:
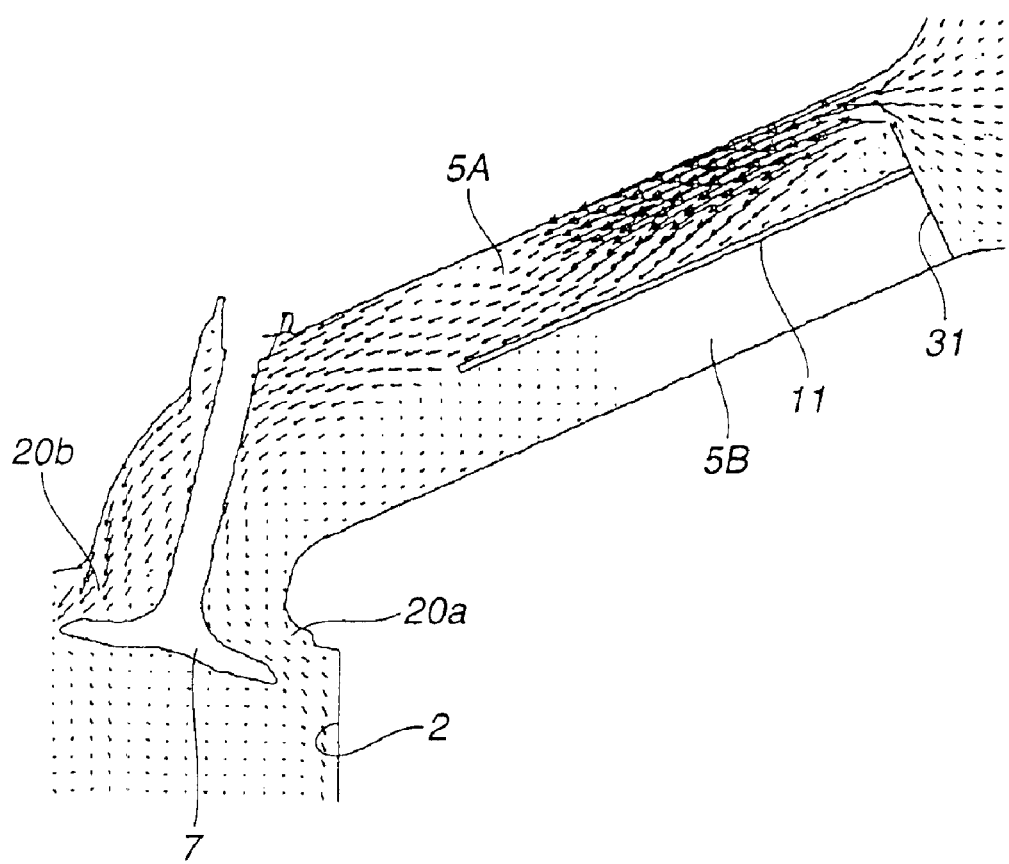

In FIG. 4, the speed and direction of fluid flow in each of points are shown as a vector by a small arrow. The density of arrows indicates the flow rate. The flow rate is high in a region in which arrows are dense, and low in a region in which arrows are coarse. FIG. 5 shows intake air flow in a comparative example in which the connection passage 12 is closed. The arrangement of FIG. 5 corresponds to an intake system of earlier technology in which the intake air flow is deflected to one side merely by a partition wall 11 and a gas motion control valve 31. In both examples of FIGS. 4 and 5, the opening degree of gas motion control valve 31 is held at the same value (about 20%).

As evident from comparison between FIGS. 4 and 5, a considerable amount of intake air diffuses downward on the downstream side of the downstream end 11a of partition 11 in the example of FIG. 5, and flows through the lower open portion 20a on the lower side of intake valve 7 into the cylinder. In lower passage section 5B, the intake air is almost motionless and stagnant. In the case of FIG. 4, by contrast, intake air is recirculated from a lower region near intake valve 7. Therefore, the intake flow through lower open portion 20a is reduced significantly, and hence the flow through upper open portion 20b is increased correspondingly. Thus, the intake configuration of FIG. 4 can increase the incylinder tumble effectively.

Figure 6:
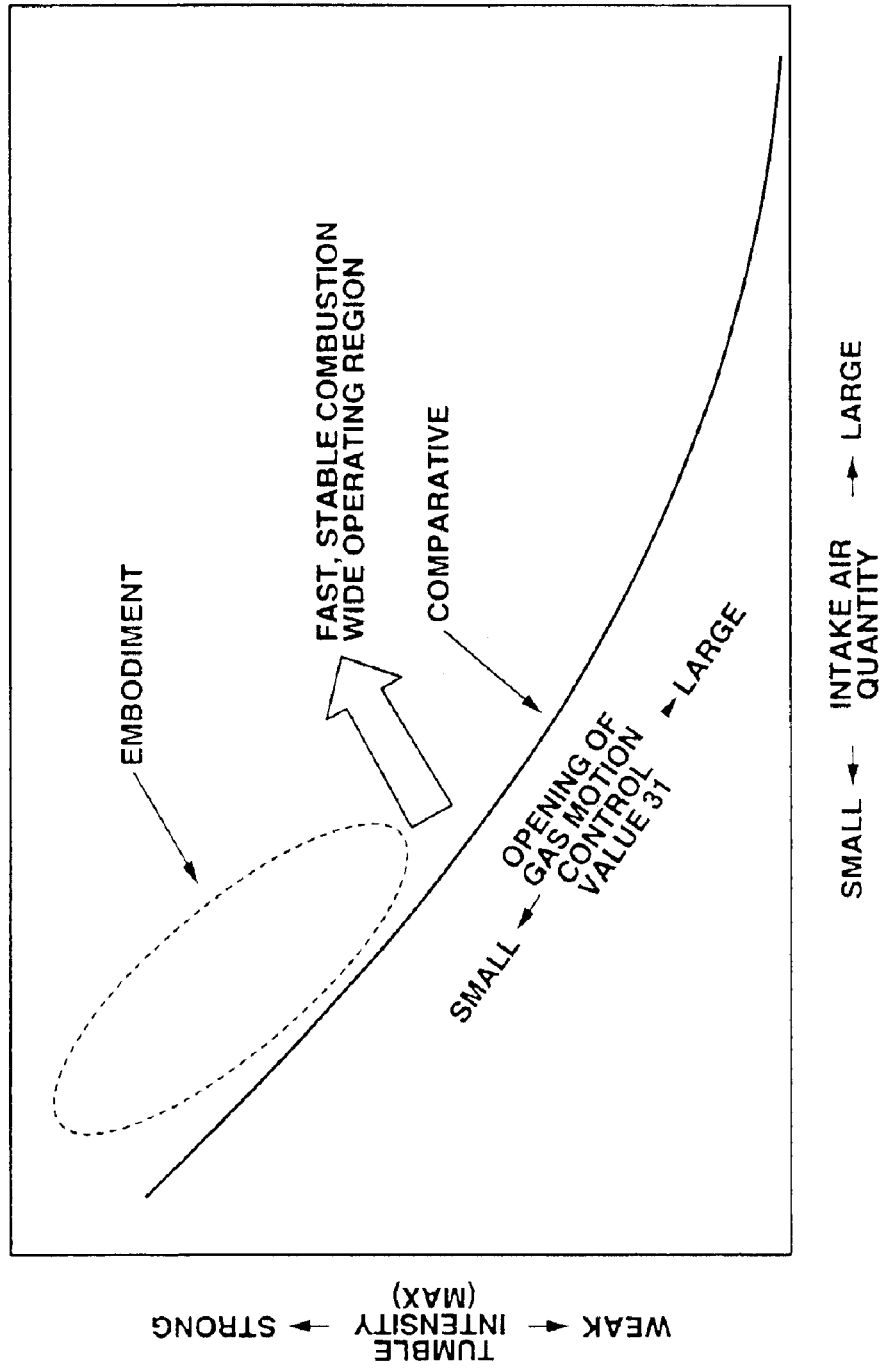
FIG. 6 is a graph showing the strength of tumble and the intake air quantity in the intake system of FIG. 1.

FIG. 6 shows a relationship between the tumble intensity and the intake air quantity in an intake system employing partition 11 and gas motion control valve 31 as in the examples of FIG. 4 and FIG. 5. In FIG. 6, the tumble intensity is expressed in terms of a maximum value of the tumble ratio during intake stroke. In general, the combustion tends to be slow and unstable when the tumble is weak, and the combustion tends to be fast and stable when the tumble is strong. A characteristic of the comparative example of FIG. 5 is shown by a solid line curve in FIG. 6. In the case of this solid line characteristic, the tumble and the intake air quantity are related to each other in the following manner. As the open area ratio or opening degree of gas control valve 31 is set to a smaller value, the tumble is increased but the intake air quantity becomes smaller. As the open area ratio or opening degree is increased, on the other hand, the intake air quantity is increased, but the tumble is decreased. A decrease of the intake air quantity means a reduction in the area of a tumble operating region in which tumble can be produced, that is an operating region in which gas motion control valve 31 can be closed. Inversely, an increase of intake air quantity means an increase in the area of the tumble operating region. In the example of FIG. 4 according to the first embodiment, there is formed a region shown by a broken line in FIG. 6 in which the intake air quantity can be increased with the tumble remaining constant, or the tumble is increased when the intake air quantity (or the opening degree) is held constant.

The intake system according to the first embodiment can employ an engine operating mode using the exhaust gas recirculation in a large quantity and strong tumbling in combination in a broader engine operating region, and thereby improve the fuel economy significantly as a whole. When compared in the same operating region, the intake system according to the first embodiment can further increase the amount of EGR with the aid of strong tumble, and further improve the fuel consumption.

FIGS. 7 and 8 show the reverse flow preventing masking area in a first practical example which can be employed in the first embodiment. In the masking area near the downstream port ends (or intake valve openings) 43 which are opened and closed by intake valves 7, respectively, there is formed the bulge 51 designed to prevent or restrain a reverse flow of intake air from the inside of cylinder 2 toward the second passage section 5B of intake port 5. The masking area is a region shaded in FIG. 8, between the pair of downward port ends or valve openings 43, and a part of the outer periphery of the combustion chamber 4, in a reference plane P of the intake side sloping surface of the pent-roof in which the downward intake port ends 43 are opened. The bulge 51 is formed in this masking area. Bulge 51 is a raised portion slightly raised inward from the reference plane P, as shown by hatching in FIG. 7. Therefore, this bulge 51 functions as a squish area to form a squish in cylinder 2 when piston 10 reaches the top dead center and the distance between bulge 51 and the piston crown is minimized.

Bulge 51 is formed only in a part of a 360° circumferential region around each downstream intake port end 43 on the side near second passage section 5B, so as to restrain a flow of intake air through this region. Thus, the bulge 51 in the masking area functions to restrain a reverse flow (or back flow or counter flow) of fluid from the inside of cylinder 2 into intake port 5. When gas motion control valve 31 is in the closed position closing the upstream end of second passage section 5B, the intake air in second passage section 5b is drawn backward toward the upstream side by a recirculating flow produced through connection passage 12. By the effect of this intake recirculation flow, the inflow into cylinder 2 through the lower opening portion 20a on the radial outer side of cylinder 2 is decreased as shown in FIGS. 3 and 4. However, at a stage slightly delayed from the instant at which intake valves 7 are opened, the intake air may be drawn backward from the inside of cylinder 2 into second passage section 5B through the lower opening portion 20a. The intake air drawn from the combustion chamber contains fuel in the form of air-fuel mixture. Therefore, the back flow of intake air from the combustion chamber into intake port 5 is undesirable because the back flow tends to cause errors in the actual amount of fuel supplied to cylinder 2, and the actual amount of intake air in cylinder 2. In this example, bulge 51 serves as masking area for preventing the back flow of intake air from the inside of cylinder 2 into intake port 5, and as squish area. Therefore, this intake system can produce active incylinder fluid motion with strong tumble and squish.

When bulge 51 is required to serve only as the reverse flow preventing masking area without expecting the function of the squish area, bulge 51 may be a projection formed, like a circular arc, in the rim of the downstream port end or valve opening 43. Alternatively, bulge 51 may be formed as a raised portion raised from a curved reference surface around a valve opening or downstream port end 43 when the combustion chamber is of a hemispherical chamber type, for example.

Figure 9:
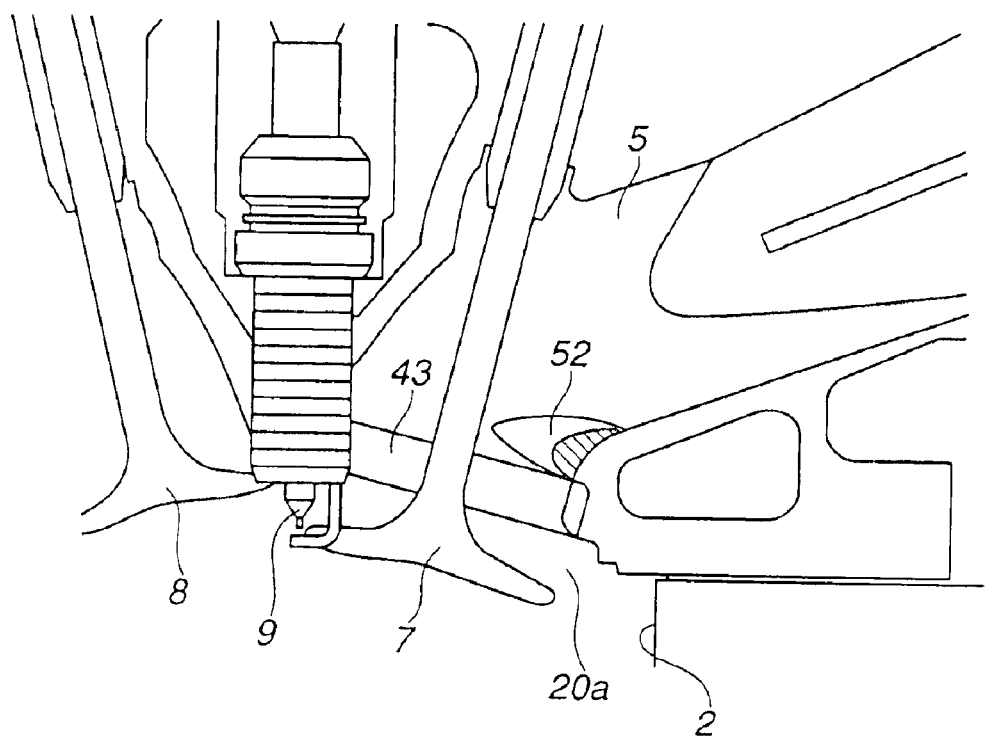
FIG. 9 is an enlarged sectional view showing a bulge formed in a masking area in a second practical example which can be employed in the present invention.
Figure 10:
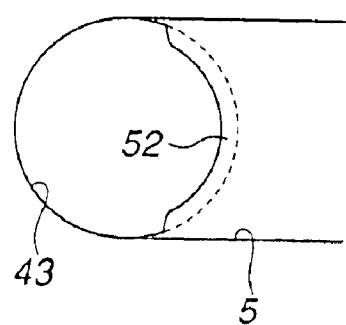
FIG. 10 is a view showing the masking area of FIG. 9 in a downstream intake port end as viewed from above.

FIGS. 9 and 10 show the reverse flow preventing masking area in a second practical example which can be employed in the first embodiment. In the second practical example, a bulge 52 serving as the reverse flow preventing masking area is formed in intake port 5. Bulge 52 is a raised portion projecting radially inwardly in the downstream port end 43 or each of the downstream port ends 43, at a position near the downstream port end 43 on the upstream side of the downstream port end 43. Bulge 52 projects so as to form a smooth projection like a dam.

Bulge 52 is formed only in a part of a 360° circumferential region around each downstream intake port end 43 or the downstream intake port end 43, on the side near second passage section 5B, so as to restrain a flow of intake air through this region. Bulge 52 is positioned near the lower opening region 20a so as to restrain the reverse flow through the lower opening region 20a between the intake valve 7 and the outer circumference of cylinder 2. In this example, bulge 53 is formed in each of the downstream intake port ends 43. Thus, the bulge 52 in the masking area functions to restrain the reverse flow (or back flow or counter flow) of fluid from the inside of cylinder 2 into intake port 5 through the lower valve opening 20a on the radial outer side of the intake valve 7 away from the axis of cylinder 2. In this example, bulge 52 is formed in each of the downstream branches of intake port 5 separated by the center wall 15.

Figure 11:
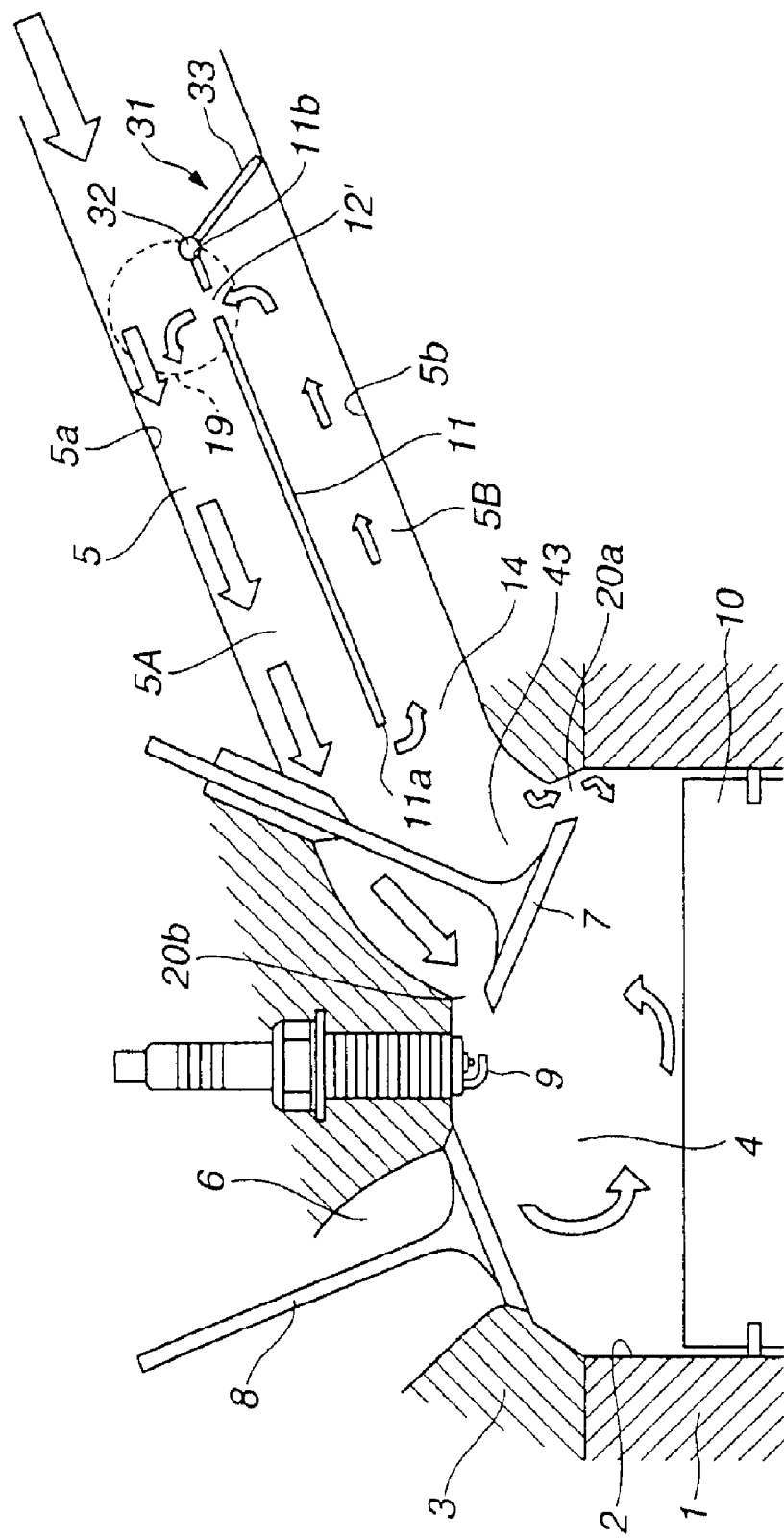
FIG. 11 is a sectional view showing an engine with an intake system according to a second embodiment of the present invention.
Figure 12:
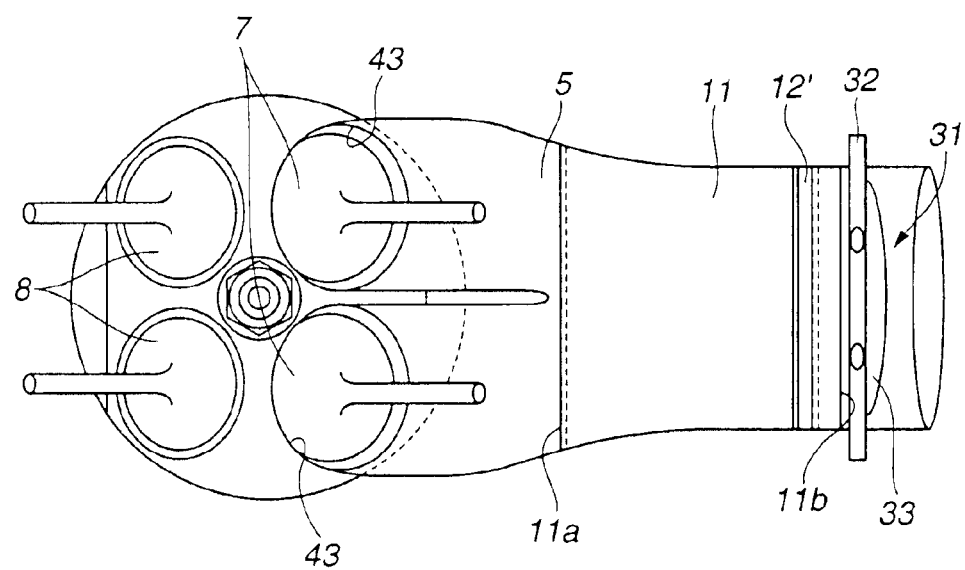
FIG. 12 is a plan view of the intake system of FIG. 11 as viewed from above.

FIGS. 11 and 12 schematically show an intake system according to a second embodiment of the present invention. This intake system is substantially identical to the intake system of FIG. 1 in most points as shown by using the same reference numerals. A valve element 33 of a gas control valve 31 has a first valve portion 33a, and has no second valve partition 33b. One end of valve element 33 is fixed to a valve shaft 32 which is located at a position adjacent to the upstream end 11b of partition with almost no clearance therebetween. The valve element 33 extends continuously from upstream end 11b of partition 11.

In the second embodiment, a connection passage 12' is opened in an upstream end portion of partition 11 near the upstream end 11b. As shown in FIG. 12, connection passage 12' is in the form of a slit extending in the direction of the cylinder row (in a direction perpendicular to the longitudinal direction of intake port 5, or in a widthwise direction of partition 11) in parallel to the upstream end 11b of partition 11. Connection passage 12' opens into a low pressure region 13 produced in the upper passage section 5A when the lower passage section 5B is closed by gas control valve 31, as shown in FIG. 11.

In the closed position in which valve element 33 closes the upstream end of lower passage section 5B, the connection passage 12' of partition 11 is open to the low pressure region 13 formed by gas motion control valve 31 in the closed position. Therefore, like the first embodiment shown in FIGS. 1 and 2, part of the intake air is recirculated through lower passage section 5B from downstream end 14 to connection passage 12'. In the closed position closing second passage section 5B, the plate valve element 33 of gas motion control valve 31 is slightly inclined so as to guide intake air into first passage section 5A toward upper inside wall surface 5a. In the open position, plate valve element 33 extends continuously from partition 11 to the upstream side.

The intake system according to the second embodiment can also employ at least one of the reverse flow preventing masking area 51 of the first practical example shown in FIGS. 7 and 8, or the reverse flow preventing masking area 52 of the second practical example shown in FIGS. 9 and 10.

In the intake system according to the second embodiment, too, like the first embodiment, a low pressure region is formed slightly downstream of the upstream end 11b of partition 11 when the upstream end of second passage section 5B is closed by gas motion control valve 31, and an intake recirculating flow is produced through connection passage 12'. Bulge 51 or bulges 52 can restrain the back flow from the inside of cylinder 2 into second passage section 5B. In the closed position closing second passage section 5B, the plate-shaped valve element 33 is inclined so as to guide the intake flow into first passage section 5A smoothly, as in the first embodiment. In the open position, valve element 33 is aligned with partition 11 as in the first embodiment.

The intake systems according to the first and second embodiments are designed to strengthen the tumble (vertical swirl). However, the intakes system according to the present invention can be used for strengthening swirl (horizontal swirl) in cylinder 2 by changing the position and orientation of partition 11. Alternatively, the intake system may be arranged to strengthen a swirling motion in an oblique plane by combining tumbling motion and swirling motion. In such cases, a reverse flow preventing bulge serving as masking area is formed in a part of the circumference of a downstream intake port end of each downstream intake port end, in conformity with the orientation of the partition.

In the illustrated examples, at least one of partition 11 and gas motion control valve 31 corresponds to a flow regulating section. First means for defining an intake port corresponds to at least the cylinder head 3. Second means for dividing the intake port into first and second passage sections corresponds to partition 11. Third means for closing an upstream end of the second passage section and forming a low pressure region in the first passage section corresponds to valve element 33. Connection passage 12 or portions defining connection passage 12 corresponds to fourth means for drawing intake air from a downstream end of the second passage section through the second passage section to the low pressure region in the first passage section when the upstream end of the second passage section is closed. Bulge 51 or 52 corresponds to fifth means for restraining a reverse flow of fluid drawn from the combustion chamber into the second passage section of the intake port.

This application is based on a prior Japanese Patent Application No. 2003-113600 filed on Apr. 18, 2003. The entire contents of this Japanese Patent Application No. 2003-113600 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An internal combustion engine, comprising:

a main section defining an intake port leading to a cylinder of the engine;

an intake valve arranged to open and closet a downstream port end of the intake port; and a flow regulating section to regulate an intake air flow in the intake port into the cylinder, the flow regulating section including;

a partition extending in the intake port in a longitudinal direction of the intake port from an upstream end to a downstream end, and dividing the intake port into first and second passage sections;

a gas motion control valve located by the upstream end of the partition, to open and close the second passage section;

a connection passage formed near the gas control valve, to connect the first and second passage sections, and to allow recirculation flow of intake air in the second passage section from the second passage section to the first passage section when the second passage section is closed by the gas motion control valve; and a bulge formed in a first part of a circumferential region surrounding the downstream port end of the intake port on a side near the second passage section.

2. The internal combustion engine as claimed in claim 1, wherein the flow regulating section is arranged to decrease an intake air stream flowing into the cylinder through a first opening region between the intake valve and the first part of the circumferential region and to increase an intake air stream flowing into the cylinder through a second open region between the intake valve and a second part of the circumferential region diametrically opposite to the first part when the second passage section is closed by the gas motion control valve; and the bulge extends around the downstream port end only in the first part of the circumferential region surrounding the downstream port end of the intake port.

3. The internal combustion engine as claimed in claim 1, wherein the second passage section is located under the first passage section in an up-down direction of the cylinder of the engine; and the second open region is located at a radial inner position, and the first open region is located at a radial outer position which is remoter from an axis of the cylinder than the second open region; and wherein the bulge is projected so as to restrain reverse flow of fluid from an inside of the cylinder into the second passage section of the intake port when the second passage section is closed by the gas motion control valve.

4. The internal combustion engine as claimed in claim 1, wherein the bulge is formed in an inside wall surface of a combustion chamber of the cylinder.

5. The internal combustion engine as claimed in claim 4, wherein the bulge bulges inward in the combustion chamber from a combustion chamber reference plane.

6. The internal combustion engine as claimed in claim 4, wherein the bulge bulges downward in the combustion chamber from an upper wall surface of the combustion chamber so as to form a squish area in the combustion chamber.

7. The internal combustion engine as claimed in claim 5, wherein the combustion chamber is of a pent-roof type, and the bulge bulges inward in the combustion chamber from the combustion chamber reference plane on the intake side of the combustion chamber of the pent-roof type.

8. The internal combustion engine as claimed in claim 1, wherein the bulge is formed in an inside wall surface of the intake port, and the bulge bulges into the downstream port end.

9. The internal combustion engine as claimed in claim 2, wherein the intake port terminates with two of the downstream port ends opening into a combustion chamber of the cylinder; the cylinder of the engine is provided with two of the intake valves to open and close the downstream port ends, respectively; and the bulge is formed in the first part of the circumferential region of each of the downstream port ends of the intake port.

10. The internal combustion engine as claimed in claim 9, wherein the bulge is formed in a region between the downstream port ends of the intake port and an outside boundary of the combustion chamber.

11. The internal combustion engine as claimed in claim 9, wherein the second passage section is located under the first passage section in an up-down direction of the cylinder of the engine; and a combustion chamber of the cylinder is of a pent-roof type, and the bulge bulges inward in the combustion chamber from a combustion chamber reference plane on the intake side of the combustion chamber of the pent-roof type.

12. The internal combustion engine as claimed in claim 9, wherein the intake port includes two downstream branches leading to the downstream port ends, respectively, and the bulge is formed in an inside wall surface of each downstream branch of the intake port.

13. The internal combustion engine as claimed in claim 1, wherein the connection passage is in the form of an interspace between the upstream end of the partition and the gas motion control valve in a closed position closing the second passage section.

14. The internal combustion engine as claimed in claim 1, wherein the connection passage is opened in the partition.

15. The internal combustion engine as claimed in claim 1, wherein the gas motion control valve is arranged to reduce an open sectional area of the intake port to produce a low pressure region in the first passage section of the intake port; and the connection passage connects an upstream end portion of the second passage section to the low pressure region produced in the first passage section to promote recirculating flow of intake air in the second passage section from a downstream end of the second passage section to the upstream end portion of the second passage section, and from the upstream end portion to the first passage section when the second passage section is closed by the gas motion control valve.

16. An intake apparatus for an internal combustion engine, comprising:
   first means for defining a combustion chamber and an intake port leading to the combustion chamber;
   second means for dividing the intake port into first and second passage sections extending in a longitudinal direction of the intake port;
   third means for closing an upstream end of the second passage section and forming a low pressure region in the first passage section;
   fourth means for drawing intake air from a downstream end of the second passage section through the second passage section to the low pressure region in the first passage section when the upstream end of the second passage section is closed; and
   fifth means for restraining a reverse flow of fluid drawn from the combustion chamber into the second passage section of the intake port.

* * * * *